Figure 1:
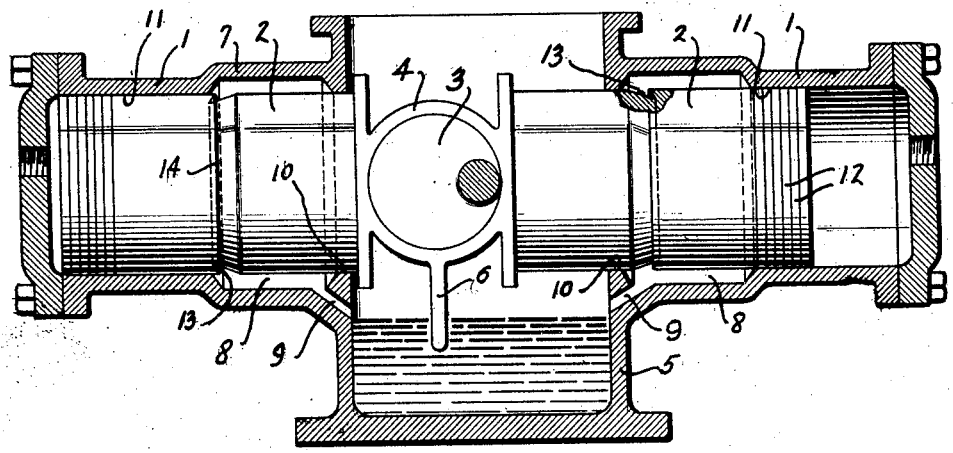

June 24, 1930.   F. A. MYERS   1,766,829
MEANS FOR PREVENTING OIL FROM PASSING PISTONS Filed Dec. 9, 1927

Inventor

FREDERICK A. MYERS

By Spear, Middleton, Donaldson & Hall

Attorney

Patented June 24, 1930

1,766,829

UNITED STATES PATENT OFFICE

FREDERICK A. MYERS, OF PHILADELPHIA, PENNSYLVANIA, ASSIGNOR TO DUNNING COMPRESSOR CO., OF PHILADELPHIA, PENNSYLVANIA, A CORPORATION OF PENNSYLVANIA

MEANS FOR PREVENTING OIL FROM PASSING PISTONS

Application filed December 9, 1927. Serial No. 238,907.

My present invention relates to means for preventing oil from leaking or passing pistons.

The invention has particular utility in connection with air compressors furnishing compressed fluid to paint sprayers where it is important that the air so compressed be kept free from lubricant.

The invention is applicable, however, to all circumstances where reciprocating pistons are used, where it is desirable to provide an escape for oil back to the sump to prevent seepage past the piston.

To this end the invention consists in providing the cylinder surrounding the piston and in which the piston reciprocates with an offset channel spaced from the piston wall or skirt, and a duct or vent from the space between the offset portion and the piston communicating with the oil sump.

The invention further consists in the novel arrangement, construction and combination of parts more fully hereinafter described and shown in the drawings.

In the drawings, Fig. 1 is a sectional elevation of one embodiment of the invention as applied to an air compressor.

Figure 2:
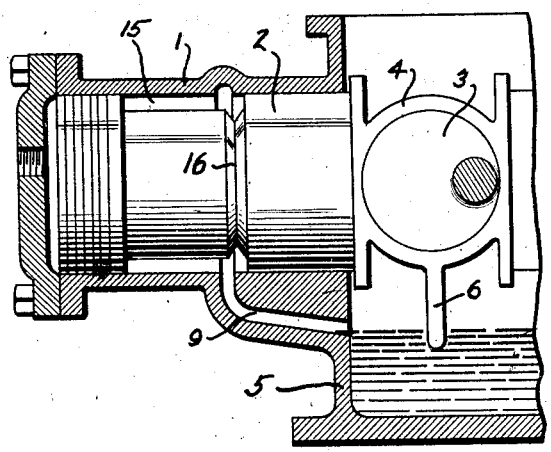

Fig. 2 is a similar view of a modified form.

For the sake of illustrating the principle involved, I have shown the invention as embodied in an air compressor in which opposed cylinders are shown at 1 within which reciprocate pistons 2 in a horizontal direction. The usual eccentric 3 operating the pistons through yoke 4 is of ordinary construction and may be driven from any convenient power means, not shown. An oil sump 5 allows the lubricant to collect therein below the pistons. In operation, a depending splash plate 6 attached to the yoke, throws lubricant upon the piston walls.

The cylinder wall is offset as at 7, providing a substantial channel 8 between itself and the piston wall or skirt, and from this channel a duct or vent 9 communicates with the sump 5.

The cylinder wall contacts with the piston as at surfaces 10 and 11, the latter of which is provided with the usual compression rings 12.

It will be noted that oil splashed upon the piston skirt will for the most part be scraped therefrom by the contacting portion 10 of the cylinder. However, oil which passes this joint and should reach an advanced point on the piston is further caught by the inwardly facing side wall of the channel 8 where it joins the surface 11 from which it flows back to the sump 5 through duct 9. This prevents oil from passing outwardly beyond the said outer side wall of the channel 8.

In the operation of the structure as shown in Fig. 1 any oil which is not scraped from the piston 2 on its outstroke by the inner face of flange 10, remains thereon, but as a matter of operation, the foremost or outermost portion of the oil so remaining on the piston will never reach any portion of the piston which comes into contact with the outer inwardly facing side wall of the channel 8. Hence in operation, no oil will ever pass the point 14 or the inwardly facing wall of channel 8, due to the construction shown in which the channel 8 is of such width relative to the stroke of the piston and relative to the portion of the piston upon which oil is splashed that the edge of the outer side wall of the channel does not contact with any point on the piston which has been in contact with the edge of the opposite or inner side wall of the channel.

On the return or inward stroke of the piston the inner side wall of the channel 8, which wall faces outwardly, will again scrape the piston and this excess oil so scraped from the piston flows through the passage 9 and is returned to the sump 5.

In operation, therefore, there are but two effective oil scraping walls, being one on either side of the flange 10, the third so called oil scraping wall being the outer inwardly facing side wall of the channel 8 not actually serving as such in manual operation although capable of such function. It constitutes a supplementary or emergency wall capable of providing a final oil scraping barrier which absolutely insures that no oil will reach the compressed air.

In order to further prevent seepage of oil to the piston head, I provide a circumferential undercut groove 13 on the piston having a backwardly extending or overhanging ledge 14. Therefore in order for oil to travel to the piston head, it is necessary that this gap be traversed. All of the impediments above described are in addition to the usual oil rings, so that a most efficient oil trap has been provided, with means for returning the oil so trapped to the sump.

Obviously, this channel, groove and duct construction may be equally well used with a vertically reciprocating piston, the principle being the same.

It is to be noted that in all positions of the pistons, the groove 13 lies within the channel 8.

In some forms, it is desirable to construct the piston with a diminished diameter portion as shown at 15. This portion is provided as in the preferred form with a circumferential groove 16. Such an arrangement make unnecessary the offsetting of the cylinder wall as indicated at 7 in Fig. 1.

It has been found in some cases that the circumferential groove on the piston may be eliminated entirely.

What I claim is:

1. In combination, a cylinder, a piston reciprocable therein, a circumferential channel in the wall of the cylinder, said channel being defined at its inner side by an annular flange providing oppositely facing oil scraping walls and said channel being defined at its other side by an inwardly facing wall capable of scraping oil, a lubricant sump and a vent for said channel communicating with said sump, an annular undercut groove in said piston, said channel being of a width such that said groove communicates therewith throughout the stroke of the piston in the cylinder.

2. In combination, a cylinder, a piston reciprocable therein, a circumferential channel in the wall of the cylinder, said channel being defined at its inner side by an annular flange wall facing outwardly providing an oil scraping wall and said channel being defined at its other side by an inwardly facing wall, sufficiently removed to not come in contact with any point on the piston touching the opposite scraping wall for any position of the piston, a lubricant sump, and, a passage for said channel communicating with said sump.

3. In combination, a cylinder, a piston reciprocable therein, a circumferential channel in the wall of the cylinder, said channel being defined at its inner side by an annular flange providing oppositely facing oil scraping walls and said channel being defined at its other and outer side by an inwardly facing wall, said channel being of such width relative to the stroke of the piston and relative to the portion of the piston upon which oil is splashed that the edge of the outer inwardly facing side wall does not contact with any point on the piston which has been in contact with the edge of the opposite or inner oil scraping wall, a lubricant sump and a passage for said channel communicating with said sump.

In testimony whereof I affix my signature.

FREDERICK A. MYERS.